US011267429B2

(12) United States Patent
Fischer et al.

(10) Patent No.: US 11,267,429 B2
(45) Date of Patent: Mar. 8, 2022

(54) VEHICLE OCCUPANT SAFETY SYSTEM

(71) Applicant: TRW Automotive GmbH, Alfdorf (DE)

(72) Inventors: Anton Fischer, Schechingen-Leinweiler (DE); Robert Disam, Mutlangen (DE); Achim Hofmann, Tüssling (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 73 days.

(21) Appl. No.: 16/607,131

(22) PCT Filed: Apr. 23, 2018

(86) PCT No.: PCT/EP2018/060326
§ 371 (c)(1),
(2) Date: Oct. 22, 2019

(87) PCT Pub. No.: WO2018/197403
PCT Pub. Date: Nov. 1, 2018

(65) Prior Publication Data
US 2020/0298786 A1    Sep. 24, 2020

(30) Foreign Application Priority Data

Apr. 26, 2017   (DE) .......................... 102017108934.9

(51) Int. Cl.
*B60R 21/231*   (2011.01)
*B60R 21/203*   (2006.01)
(Continued)

(52) U.S. Cl.
CPC .......... *B60R 21/231* (2013.01); *B60R 21/203* (2013.01); *B60R 21/213* (2013.01);
(Continued)

(58) Field of Classification Search
CPC .... B60R 2021/0009; B60R 2021/0023; B60R 2021/0048; B60R 2021/0072;
(Continued)

(56) References Cited

U.S. PATENT DOCUMENTS

| 6,073,960 A | 6/2000 | Viano et al. |
| 6,224,088 B1 * | 5/2001 | Lohavanijaya ... B60R 21/23184 |
| | | 280/728.1 |

(Continued)

FOREIGN PATENT DOCUMENTS

| DE | 3829368 | 3/1990 |
| EP | 2617607 | 7/2013 |

*Primary Examiner* — Laura Freedman
(74) *Attorney, Agent, or Firm* — Tarolli, Sundheim, Covell & Tummino LLP

(57) ABSTRACT

A vehicle occupant restraint device comprises a control unit and a group of at least two matched airbags (20, 24; 22, 26) for the protection of a vehicle occupant (10; 16) on a particular vehicle seat (12; 16). The control unit is arranged and the airbags (20, 24; 22, 26) are disposed and designed so that, in a collision case, the control unit differentiates between a first situation in which the vehicle occupant (10; 16) is located in a standard distance area relative to a first airbag (20; 22) and a second situation in which the vehicle occupant (10; 16) is located in a rear area which is further distant from the first airbag (20; 22) than the standard distance area. When the first situation is given, the control unit activates the first airbag (20; 22) only. In contrast, when the second situation is given, the control unit activates the first airbag (20; 22) and additionally at least a second airbag (24; 26) of the group, with the first airbag (20; 22) backing the second airbag (24; 26).

15 Claims, 5 Drawing Sheets

(51) Int. Cl.
*B60R 21/213* (2011.01)
*B60R 21/233* (2006.01)
*B60R 21/00* (2006.01)

(52) U.S. Cl.
CPC ...... *B60R 21/233* (2013.01); *B60R 21/23138* (2013.01); *B60R 2021/0048* (2013.01); *B60R 2021/0072* (2013.01); *B60R 2021/23107* (2013.01)

(58) Field of Classification Search
CPC ........ B60R 2021/23107; B60R 21/203; B60R 21/213; B60R 21/231; B60R 21/23138; B60R 21/232; B60R 21/233
See application file for complete search history.

(56) References Cited

U.S. PATENT DOCUMENTS

| | | | |
|---|---|---|---|
| 6,431,586 B1 | 8/2002 | Eyrainer | |
| 6,817,626 B2 * | 11/2004 | Boll | B60R 21/213 |
| | | | 280/730.1 |
| 6,938,918 B2 * | 9/2005 | Viano | B60R 21/213 |
| | | | 280/730.1 |
| 8,764,053 B1 * | 7/2014 | Dix | B60R 21/232 |
| | | | 280/730.1 |
| 9,227,587 B1 * | 1/2016 | Belwafa | B60R 21/205 |
| 9,862,347 B2 * | 1/2018 | Deng | B60R 21/203 |
| 2002/0089152 A1 | 7/2002 | Khoudari et al. | |
| 2002/0140209 A1 * | 10/2002 | Waid | B60R 21/232 |
| | | | 280/728.2 |
| 2002/0149181 A1 | 10/2002 | Eyrainer et al. | |
| 2005/0275199 A1 | 12/2005 | Helmstetter | |
| 2006/0163848 A1 * | 7/2006 | Abe | B60R 21/231 |
| | | | 280/729 |
| 2011/0266780 A1 | 11/2011 | Komoli et al. | |
| 2016/0039383 A1 | 2/2016 | Hicken et al. | |

* cited by examiner

VEHICLE OCCUPANT SAFETY SYSTEM

RELATED APPLICATIONS

This application corresponds to PCT/EP2018/060326 filed Apr. 23, 2018, which claims the benefit of German Application No. 10 2017 108 934.9 filed Apr. 26, 2017, the subject matter of which are incorporated herein by reference in their entirety.

BACKGROUND OF THE INVENTION

The invention relates to a vehicle occupant safety system.

Vehicle occupant safety systems comprising one or more airbags generally speaking serve for protecting a driver or occupants in the event of crash. The airbags prevent the driver or the occupants, especially their heads, from impacting on the steering wheel or controls and instruments and restrain the occupant.

Various types of said vehicle occupant safety systems are known from the state of the art. In a widespread type of said vehicle occupant safety systems, an airbag is arranged at the steering wheel for protecting the driver and/or an airbag is arranged in/on the instrument panel for protecting the passenger. Further airbags are usually arranged in the area of a roof rail. This is not possible in convertibles, for which reason further airbags are rather installed in the area of the instruments or of the A-pillar.

In the event of an angular frontal impact it is possible, however, that the driver's or the passenger's head hits the airbag at an angle or does not hit the airbag at all. If the vehicle occupant's head hits the airbag at an angle, the head can experience angular accelerations.

SUMMARY OF THE INVENTION

It is the object of the invention to further develop a vehicle occupant safety system, especially for convertibles, so that in the event of an angular frontal impact rotary motions of the head are reduced.

According to the invention, the object is achieved by a vehicle occupant safety system, especially for convertibles, comprising a first airbag module arranged at an A-pillar and including a first airbag and comprising a second airbag module arranged at a steering wheel or in an instrument panel or dashboard and including a second airbag, wherein the first and second airbags are configured and arranged so that they contact each other in the inflated condition. In this way, the first airbag can back the second airbag against deformation in the direction of the door sill. The first airbag can back the second airbag especially against displacement in the direction of the door sill. Thus, the second airbag will not move sideways in the event of an angular impact of the head and the head is prevented from sliding off the second airbag. This helps avoid or at least reduce angular accelerations of the head.

In one example embodiment, the first airbag can further be designed so that the second airbag is pressed toward vehicle occupants by the first airbag. The arrangement of the first and second airbags according to the invention thus can prevent or at least strongly reduce the second airbag from moving sideways on the driver or passenger side in the event of angular impact. In addition, by the first airbag the occupant can be prevented from sliding past the second airbag toward the A-pillar, or else sliding is minimized in that direct impact of the vehicle occupant's head on the A-pillar can be prevented. The second airbag may be configured to take a cushion shape and/or a bubble shape in the inflated condition.

Preferably, the two airbags are at least partially overlapping, when viewed in the vehicle transverse direction, in the vehicle longitudinal direction and the vertical direction. Thus, the first airbag can back the second airbag especially properly against deformation in the direction of the door sill. In a further example embodiment, the two airbags are substantially overlapping only in the vehicle transverse direction and the vertical direction.

According to a preferred embodiment, in the inflated condition a vehicle sill-side portion of a surface area of the second airbag abuts on the first airbag. Consequently, the second airbag abuts on a large area of the first airbag. The larger contact face allows the first airbag to optimally back the second airbag against deformation in the direction of the door sill.

Preferably, the first and second airbags are configured and arranged in the inflated condition so that a gap between the door sill and the steering wheel is closed by the two airbags. As a result, the driver's head is reliably prevented from hitting the A-pillar through the gap in the event of crash.

According to an advantageous configuration of the invention, the first airbag in the inflated condition at least partially covers and abuts on the door sill. This prevents the head of the driver from impacting on the door sill in the event of crash.

Further preferred, in the inflated condition the first airbag rests on the door sill. In this way, more stability is imparted to the first airbag and the latter can optimally back especially the second airbag against deformation.

According to a preferred embodiment, the first airbag in the inflated condition at least partially covers a side window or the area of a side window. The first airbag may take especially a curtain shape and may cover the side window and, resp., the area in which the side window is arranged like a curtain. The first airbag can reliably prevent, in this configuration of the invention, the driver's head from impacting on the side window, from striking through the latter or from moving outwardly from the interior of the vehicle if the side window is opened or destroyed.

Further preferred, the first airbag in the inflated condition covers at least 90% of the side window. The first airbag thus can especially properly prevent the driver's head from impacting on or striking through the side window.

According to a preferred configuration of the invention, the first airbag in the inflated condition extends toward the vehicle tail end from the A-pillar to the second airbag. In this embodiment, one or more further airbag modules may be provided in the area of the door sill and/or a B-pillar and/or a roof rail to cover the window.

In another preferred example embodiment, in the inflated condition especially a vehicle occupant's far side portion of the surface area on a side of the second airbag facing the vehicle sill abuts on the first airbag. The second airbag is thus pressed toward the vehicle occupant by the first airbag. In this way, an area between the A-pillar, the instrument panel, the door sill and the second airbag can be filled by a simple first airbag. Further, in the event of an angular impact, the vehicle occupant's head can thus be prevented from impacting on the A-pillar. Preferably, such first airbag rests on the door sill and/or the instrument panel.

In another preferred example embodiment, in the inflated condition a vehicle sill-side portion of the surface area of the second airbag and a vehicle occupant's far side portion of the surface area on a side of the second airbag facing the vehicle sill abut on the first airbag. The first airbag may extend to the second airbag. Further, the first airbag can extend beyond the second airbag in the vehicle longitudinal direction and thus can cover at least part of the side window and of the door sill.

In these embodiments, equally one or more further airbag modules may be provided in the area of the door sill and/or of a B-pillar and/or of a roof rail for covering the window.

Preferably, the first airbag has a longer service life than the second airbag. In this way, the first airbag can back the second airbag over the entire service life thereof against deformation. The service life of the first airbag may especially be increased by the first airbag being coated with a laminate or any other material suited for increasing the gas tightness of the airbag material. In one example embodiment, the service life of the first airbag is increased so that an occupant is protected even for the duration of a prolonged accident. Such accident may be, for example, a vehicle rollover.

According to a preferred embodiment of the invention, the first airbag in the inflated condition is provided to take a larger width in a portion close to the vehicle front end, when viewed in the vehicle transverse direction, than in a portion distant from the vehicle front end. The first airbag may take especially in a portion located between the second airbag in the inflated condition and the A-pillar, when viewed in the vehicle longitudinal direction, a larger width than in a portion located between the second airbag and a B-pillar. This helps to achieve that, on the one hand, no gap is provided in the clearance between the door sill and the second airbag and that, on the other hand, the first airbag will properly and easily deploy between the vehicle occupant and the door sill and, resp., the side window.

The first and second airbags may be overlapping in a vehicle transverse direction and in the vertical direction, when viewed in a front view. Thus, the first airbag can back the second airbag against deformation in the vehicle longitudinal direction as well as against displacement in the vehicle transverse direction. The second airbag thus will not move or will move significantly less sideways, when the vehicle occupant's head hits the second airbag at an angle rather than frontally.

Of preference, the first airbag in the inflated condition has plural gas-filled chambers which are successively arranged at least in portions in the vehicle longitudinal direction. This enables a desired shape to be imparted to the first airbag in the inflated condition.

The shape of the gas-filled chambers can be formed especially by means of a so-called X tether system as described in EP 1 080 996 B1, for example.

In addition, the first airbag in the inflated condition may additionally have plural gas-filled chambers juxtaposed in the vehicle transverse direction. Thus, the first airbag can back the second airbag additionally toward the vehicle occupant and, where necessary, can press the second airbag in the direction of the vehicle occupant.

According to a preferred embodiment of the invention, the first airbag is provided to be fastened to the A-pillar at plural positions. This ensures the first airbag to be safely fastened to the A-pillar and to deploy to the desired position even in the event of crash.

Preferably, the first airbag is completely accommodated in an A-pillar lining. In particular, the first airbag is fastened to the A-pillar only. Thus, the first airbag thus is not visible for the driver and the occupants during normal operation of the automotive vehicle. Hence, the driver's and the occupants' esthetic perception of the vehicle interior is not impaired.

BRIEF DESCRIPTION OF THE DRAWINGS

In the following, the invention shall be described by way of plural embodiments arranged on a driver side which are shown in the attached drawings, wherein.

DESCRIPTION

Figure 1:
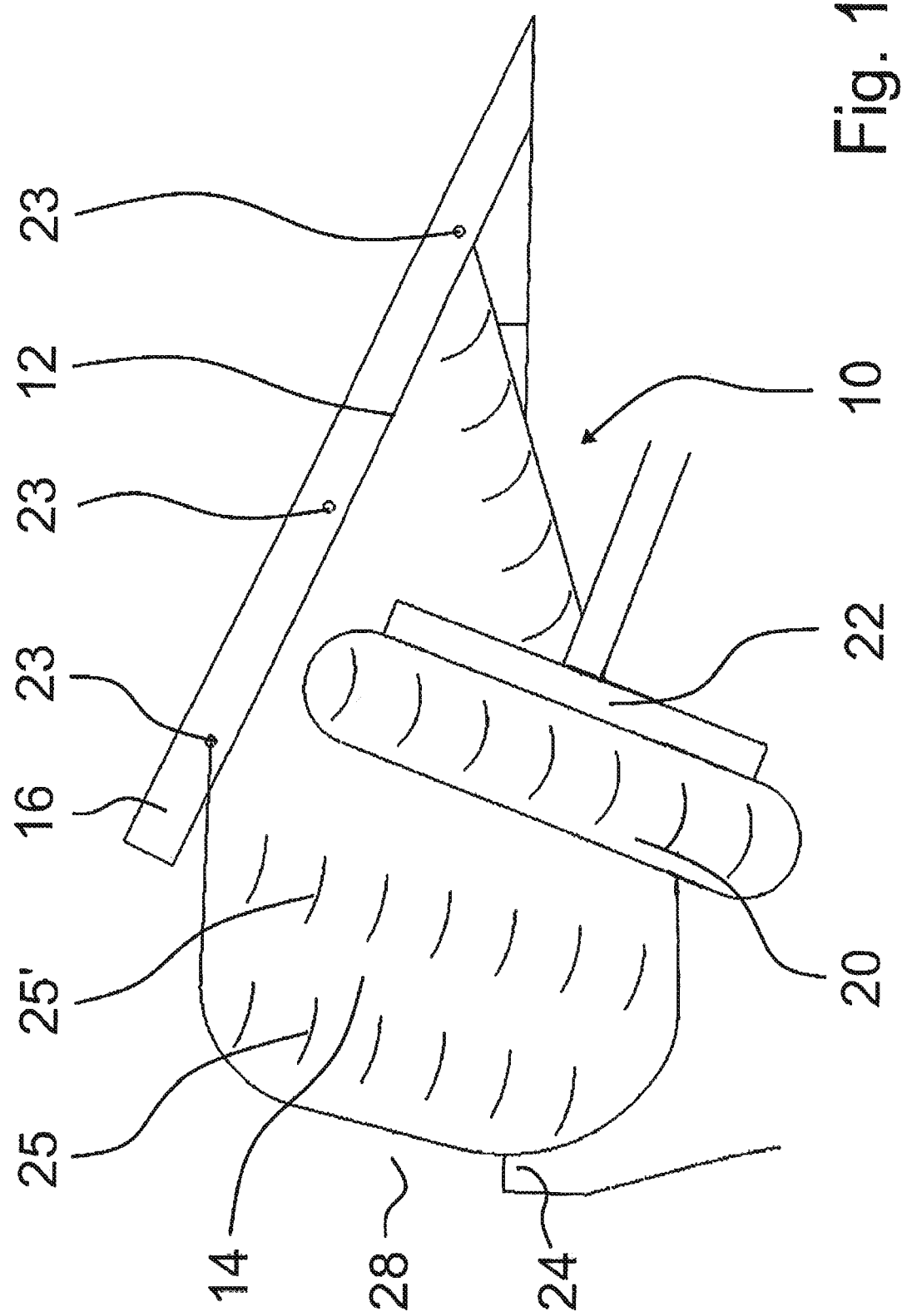
FIG. 1 shows a view in the vehicle transverse direction of a vehicle occupant safety system according to the invention in the inflated condition.

The basic structure of a vehicle occupant safety system 10 shall be illustrated hereinafter by way of FIGS. 1 and 2.

The vehicle occupant safety system 10 comprises a first airbag module 12 including a first airbag 14, the first airbag module being completely fastened to an A-pillar 16 of an automotive vehicle, especially a convertible.

The vehicle occupant safety system 10 further comprises a second airbag module 18 including a second airbag 20, the second airbag module being arranged at a steering wheel 22, more exactly in the steering wheel cup.

The two airbags 14, 20 are accommodated, in a non-inflated condition, in their respective airbag modules 12, 18 and can deploy therefrom.

The first airbag 14 is fastened to the A-pillar 16 at plural positions 23 beneath an A-pillar lining.

The functioning of the vehicle occupant safety system shall be illustrated hereinafter by way of FIGS. 1 and 2.

In the event of crash, especially in the event of an angular frontal impact of the automotive vehicle on an obstacle or another automotive vehicle, the vehicle occupant safety system 10 is triggered when sensors not shown here detect that triggering is required.

The two airbags 14, 20 deploy out of the respective airbag modules 12, 18 into their inflated condition.

Figure 2:
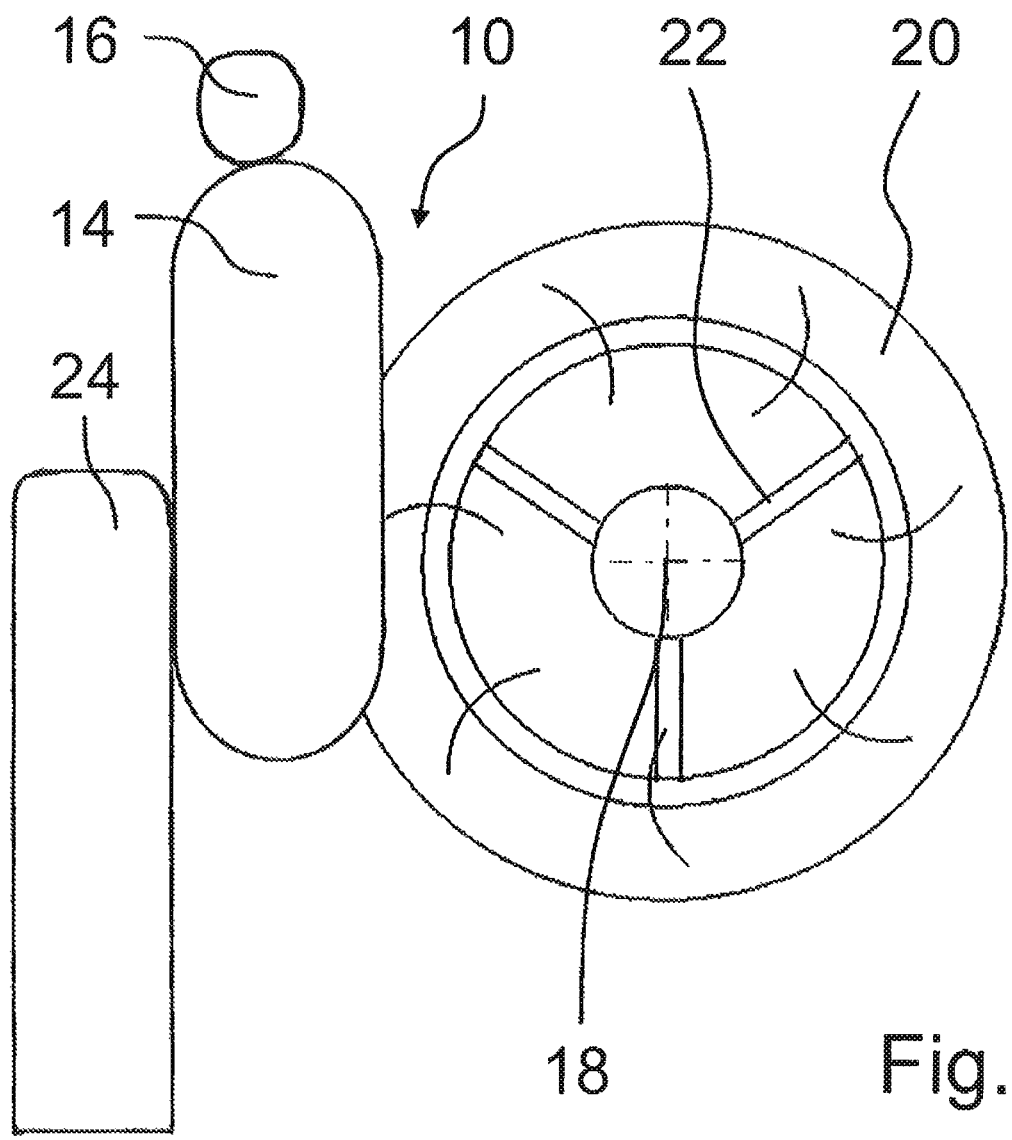
FIG. 2 shows a schematic cross-section normal to a vehicle longitudinal direction of the vehicle occupant safety system according to the invention of FIG. 1.

As is evident especially clearly from FIG. 1, the first airbag 14 extends in the area of a door sill 24 in the vehicle longitudinal direction past the second airbag 20 on the door sill side.

The first airbag 14 may include plural gas-filled, especially vertically extending chambers 25, 25' which are successively arranged in portions in the vehicle longitudinal direction. The shape of the gas-filled chambers 25, 25' may be formed by an X tether system in the interior of the airbag. The gas-filled chambers 25, 25' which are open toward each other may especially serve for imparting a desired mattress-like shape to the first airbag 14 in the inflated condition.

The first airbag 14 may take a larger width in the vehicle transverse direction in a portion close to the vehicle front end, viz. in a portion between the second airbag 20 and the A-pillar 16, than in a portion distant from the vehicle front end, viz. in a portion between the second airbag 20 and the rear end of the vehicle door.

The first airbag 14 partially covers and abuts on the door sill 24. The first airbag 14 extends downwards to close to the arm rest.

In the embodiment shown here, the first airbag 14 covers a segment of a side window 28 in a curtain-like manner, more exactly speaking, more than 90% of the side window 28 and, resp., of the area in which the side window 28 is arranged in the closed condition are covered by the first airbag 14. In this way, the first airbag 14 can prevent the driver's head from impacting on or striking through the side window 28 in the event of crash. Moreover, thus the vehicle occupant's head can be prevented from moving outwards from the interior of the vehicle if a side window is opened or destroyed.

The first airbag 14 consequently protects the driver's head against impacting on the door sill 24 and the side window 28.

In the side view shown in FIG. 1, the first airbag 14 and the second airbag 20 are overlapping in the vehicle longitudinal direction and in the vertical direction. More exactly speaking, the orthogonal projections of the two airbags 14, 20 are overlapping in a plane spanned by the vehicle longitudinal direction and the vertical direction.

The two airbags 14, 20 moreover mutually contact each other. In the embodiment shown here, a substantial part of a door sill-side surface area of the second airbag 20 abuts on the first airbag 14.

Thus, the first airbag 14 can back the second airbag 20 against deformation in the vehicle transverse direction, especially against displacement in the vehicle transverse direction. Hence, the second airbag 20 does not move sideways even if a driver's head hits the second airbag 20 at an angle rather than frontally.

The first airbag 14 further can be designed especially so that the first and second airbags 14, 20, when viewed in a front view, are overlapping in the vehicle transverse direction and the vertical direction. Thus, the first airbag 14 can back the second airbag 20 even against deformation in the vehicle longitudinal direction.

The first airbag 14 rests on the door sill 24 against deformation in the direction of the door sill 24. This allows the first airbag 14 to support the second airbag 20 even better.

The first airbag 14 has a longer service life than the second airbag 20. This can be achieved, for example, by the first airbag 14 being coated with laminate or any other material which is suited for increasing the gas tightness. The first airbag 14 is thus capable of backing the second airbag 20 over the entire service life of the first airbag 14. In addition, this allows an occupant to be protected even for the duration of a prolonged accident.

Furthermore, a gap between the second airbag 20 and the door sill 24 is closed so that the driver's head cannot impact on the A-pillar 16 through said gap. Angular accelerations of the head are consequently avoided or at least reduced by the vehicle occupant safety system 10.

Figure 3:
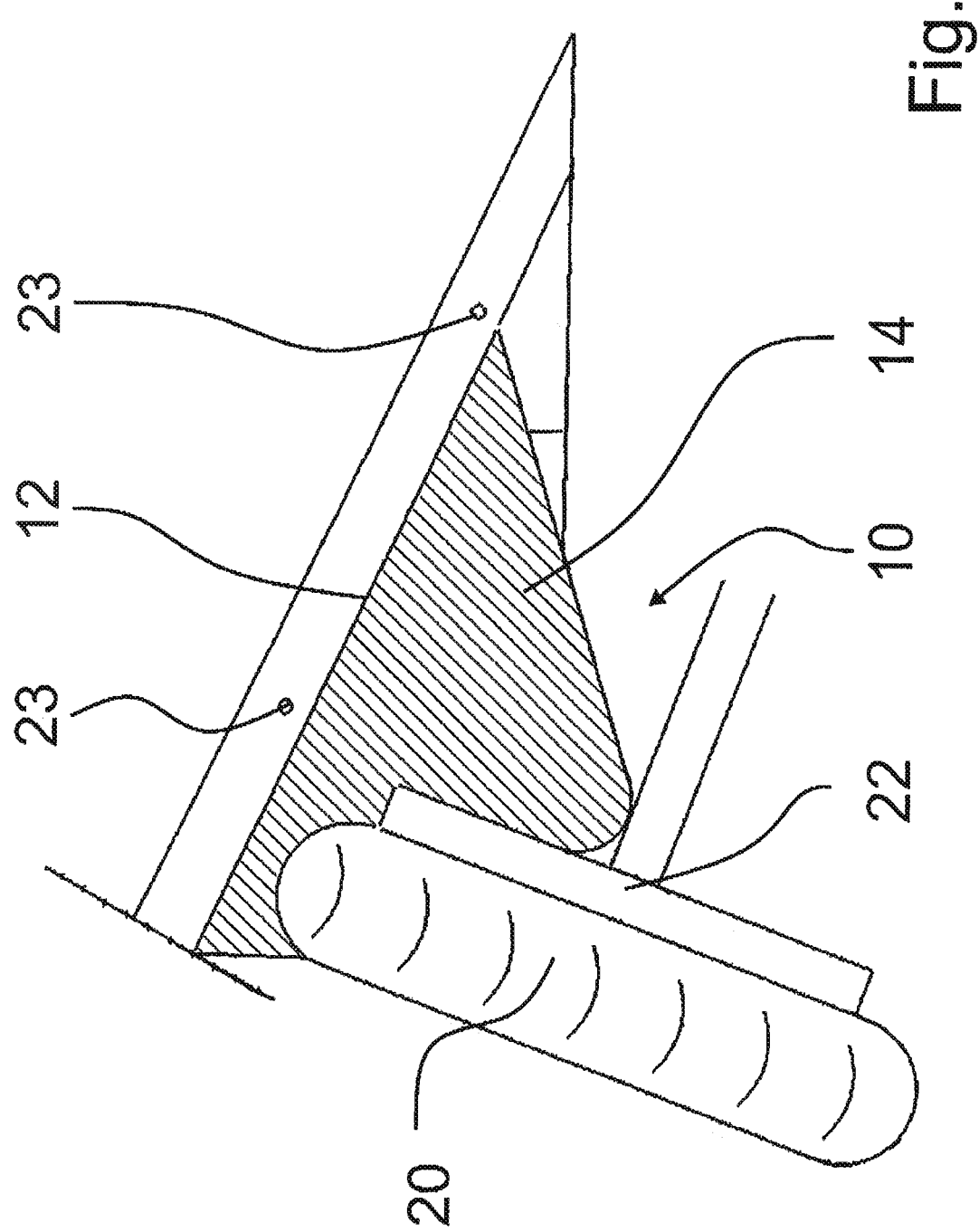
FIG. 3 shows a lateral view of an alternative embodiment of a vehicle occupant safety system according to the invention.

FIG. 3 illustrates a vehicle occupant safety system in accordance with an alternative embodiment. The difference from the afore-described embodiment consists in the fact that a first airbag 14 is configured to be shorter, when viewed in the vehicle longitudinal direction.

The first airbag 14 in the inflated condition extends from the A-pillar 16 toward the vehicle tail end to the second airbag 20.

In this embodiment, the first airbag 14 in the inflated condition primarily serves for backing a second airbag 20 that has left a second airbag module 18 arranged at a steering wheel 22 and for closing a gap between a door sill 24 and the steering wheel 22.

For backing the second airbag, in the shown inflated condition a portion of the surface area of the second airbag 20 on the vehicle sill side and, resp., facing the door sill 24 abuts on the first airbag 14.

In this embodiment, the first airbag 14 does not serve for protecting the driver's head against impacting on the door sill 24 or a side window 28. However, the airbag 14 can equally help prevent the vehicle occupant's head from impacting on the A-pillar 16.

In addition, one or more further airbags may be provided in the area of the door sill and/or of a B-pillar and/or of a roof rail for covering the window.

Regarding the remaining features and the mode of operation, the foregoing explanations are referred to.

Figure 4:
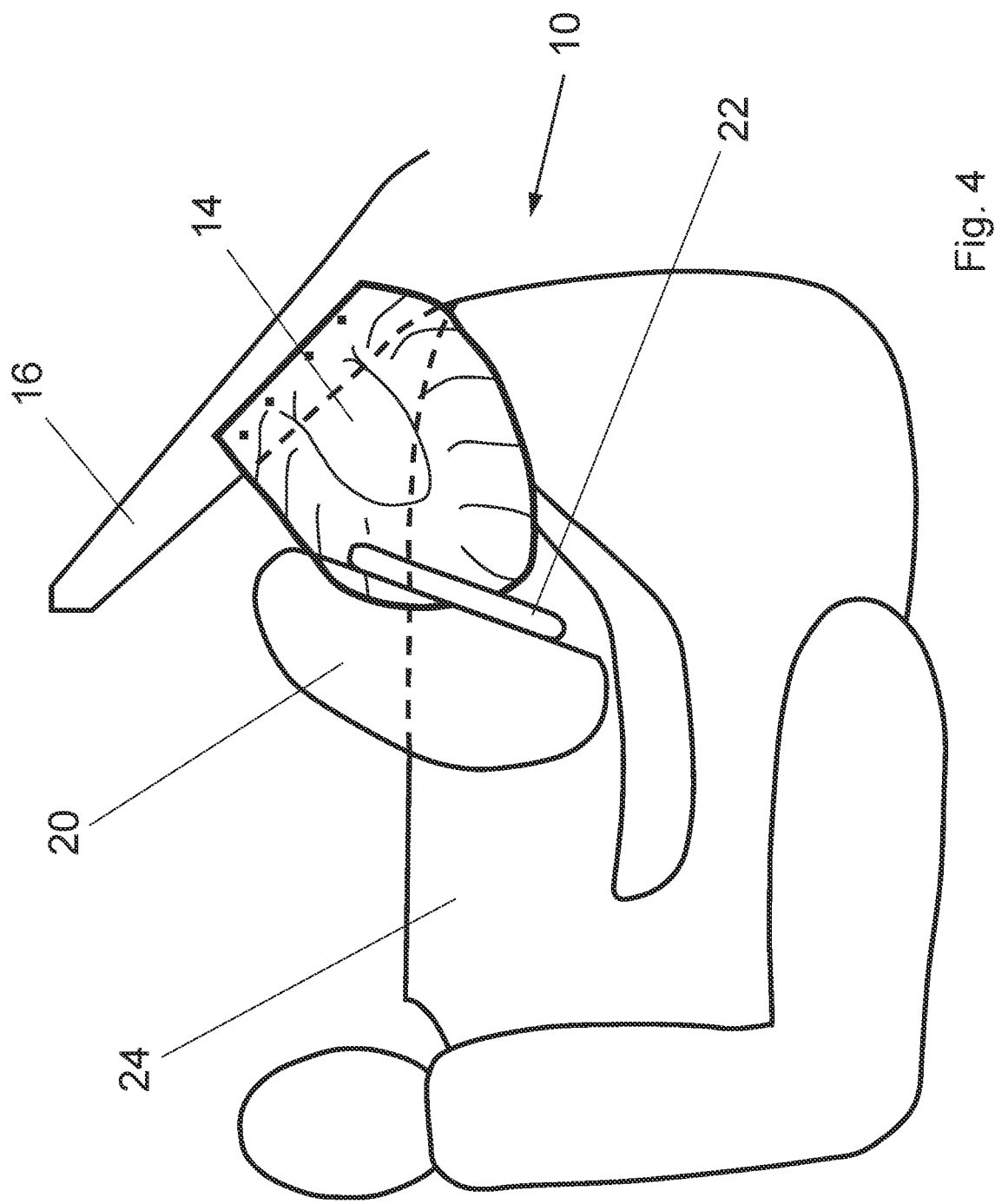
FIG. 4 shows a schematic lateral view of another alternative embodiment of a vehicle occupant safety system according to the invention.

FIG. 4 illustrates another example embodiment of a vehicle occupant safety system 10 according to the invention. In this embodiment, the first airbag 14 in the inflated condition equally serves substantially for backing a second airbag 20 that has left the second airbag module 18 arranged at the steering wheel 22 and for closing a gap between a door sill 24 and the steering wheel 22.

The substantial difference from the vehicle occupant safety system 10 as shown in FIG. 3 resides in the fact that, in the illustrated inflated condition, a vehicle occupant's far side portion of a surface area on a side of the second airbag 20 facing the vehicle sill or door sill 24 abuts on the first airbag 14. Consequently, the backing of the second airbag 20 by the first airbag is effectuated substantially in a vehicle transverse direction. Preferably, the second airbag 20 can thus be pressed toward the vehicle occupant by the first airbag 14 in an inflated condition. This prevents or at least minimizes the second airbag 20 from moving sideways in the event of an angular impact. Preferably, the first airbag 14 additionally helps prevent a vehicle occupant's head from impacting on the A-pillar 16.

Figure 5:
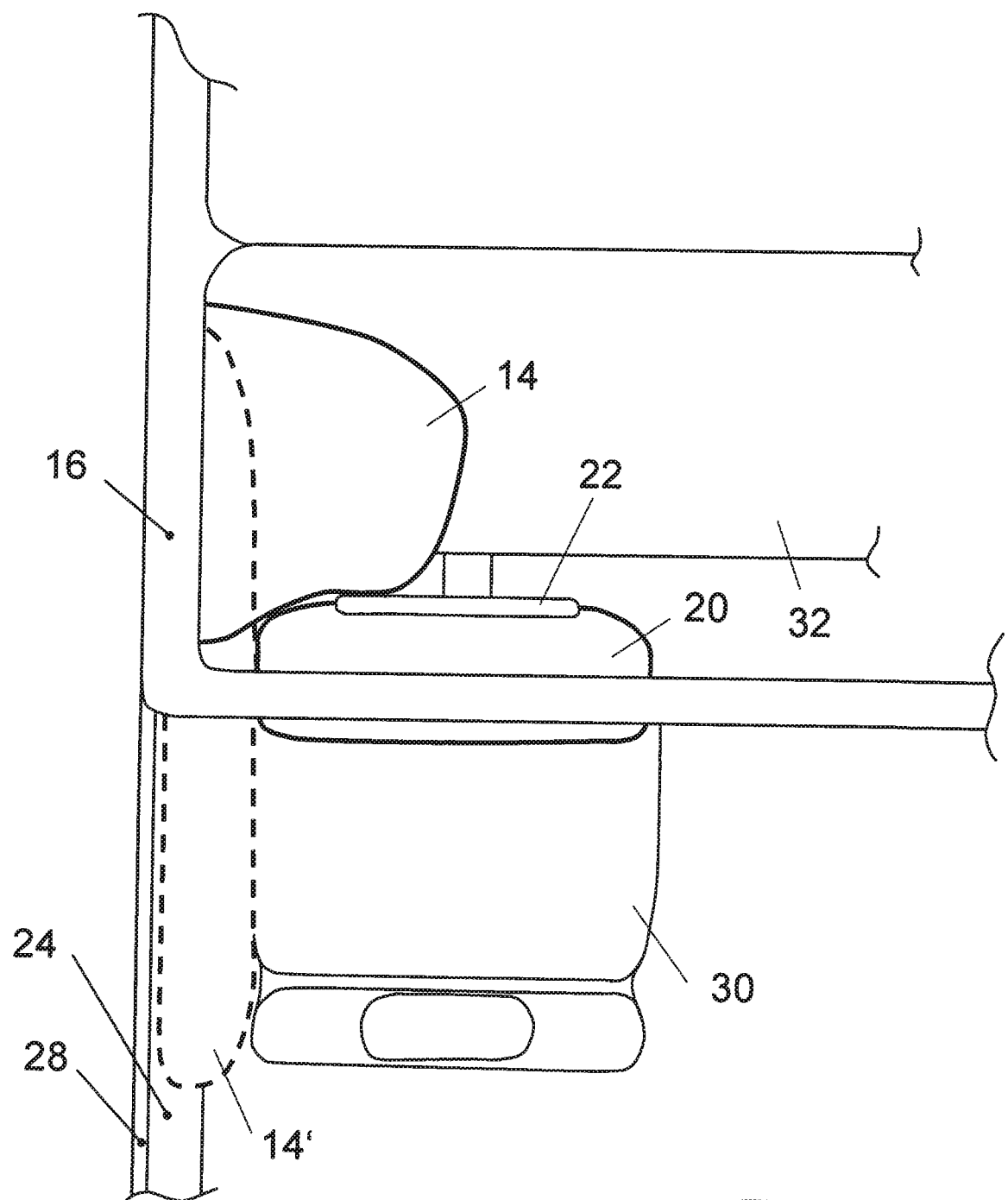
FIG. 5 shows a schematic top view of example embodiments of vehicle occupant safety systems according to the invention.

In FIG. 5 a schematic top view on two of the example embodiments of the safety system 10 according to the invention is illustrated. The first airbag 14 in FIG. 5 substantially corresponds to the first airbag according to FIG. 4 in which in the inflated condition a vehicle occupant's far side portion of a surface area on a side of the second airbag 20 facing the vehicle sill or door sill 24 abuts on the first airbag 14. The first airbag 14 rests substantially on an instrument panel 32 and fills an area between the A-pillar 16, the instrument panel 32, the door sill 24 and the second airbag 20.

Moreover, in FIG. 5 a first airbag 14' is shown by broken lines which substantially corresponds to a first airbag 14 according to FIG. 1 in which the first airbag 14' extends past the second airbag 20 on the door sill side in the area of a door sill 24 in the vehicle longitudinal direction. The vehicle sill-side portion of the surface area of the second airbag 20 abuts on the first airbag 14. In the shown example embodiment, the first airbag 14' extends along the door sill over a substantial part of the side window 28 to an area of the seat back of a vehicle seat 30.

A first airbag 14 according to the invention may further include, in another example embodiment, an outer contour corresponding to an intersection of the outer contours of the first airbags 14 and 14' according to FIG. 5.

The afore-described example embodiments can be used and applied in a similar manner equally on the passenger side to improve the passenger-side occupant protection, with the second airbag corresponding to the passenger airbag in this case.

The invention claimed is:

1. A vehicle occupant safety system (10) for a convertible vehicle, comprising a first airbag module (12) configured to be arranged on an A-pillar (16) of the convertible vehicle the first airbag module (12) including a first airbag (14), and comprising a second airbag module (18) configured to be arranged on a steering wheel (22) of the convertible vehicle the second airbag module (18) including a second airbag (20), wherein the first airbag (14) is configured to at least partially cover an area of a vehicle side window (28) and the second airbag (20) is configured to at least partially cover the steering wheel (22), wherein the first and second airbags (14, 20) are configured and arranged so that they contact each other in an inflated condition, and wherein the first airbag (14) is fastened to plural positions (23) of the A-pillar (16).

2. The vehicle occupant safety system (10) according to claim 1, wherein the two airbags (14, 20) are at least partially overlapping, when viewed in a vehicle transverse direction.

3. The vehicle occupant safety system (10) according claim 1, wherein in the inflated condition a vehicle window sill-side portion of a surface area of the second airbag (20) abuts on the first airbag (14).

4. The vehicle occupant safety system (10) according to claim 1, wherein in the inflated condition a surface area on a side of the second airbag (20) facing a window sill of a vehicle door abuts on the first airbag (14).

5. The vehicle occupant safety system (10) according to claim 1, wherein the first and second airbags (14, 20) are configured and are arranged in the inflated condition so that a gap between a window sill (24) of a vehicle door and the steering wheel (22) is closed by the two airbags (14, 20).

6. The vehicle occupant safety system (10) according to claim 1, wherein in the inflated condition the first airbag (14) at least partially covers and abuts on a window sill (24) of a vehicle door.

7. The vehicle occupant safety system (10) according to claim 6, wherein the first airbag (14) in the inflated condition rests on the window sill (24) of the vehicle door.

8. The vehicle occupant safety system (10) according to claim 1, wherein the first airbag (14) in the inflated condition covers at least 90% of an area of the side window (28).

9. The vehicle occupant safety system (10) according to claim 1, wherein the first airbag (14) in the inflated condition extends in a direction of a vehicle tail end from the A-pillar (16) to the second airbag (20).

10. The vehicle occupant safety system (10) according to claim 1, wherein the first airbag (14) has a longer service life than the second airbag (20).

11. The vehicle occupant safety system (10) according to claim 1, wherein the two airbags (14, 20) are at least partially overlapping when viewed in a vehicle longitudinal direction and a vehicle vertical direction.

12. The vehicle occupant safety system (10) according to claim 1, wherein the two airbags (14, 20) are at least partially overlapping when viewed in a vehicle transverse direction and a vehicle vertical direction.

13. A vehicle occupant safety system (10) for a convertible vehicle, comprising a first airbag module (12) configured to be arranged on an A-pillar (16) of the convertible vehicle, the first airbag module (12) including a first airbag (14), and comprising a second airbag module (18) configured to be arranged on a steering wheel (22) of the convertible vehicle, the second airbag module (18) including a second airbag (20), wherein the first airbag (14) is configured to at least partially cover an area of a vehicle side window (28) and the second airbag (20) is configured to at least partially cover the steering wheel (22), wherein the first and second airbags (14, 20) are configured and arranged so that they contact each other in an inflated condition, wherein the first airbag (14) in the inflated condition has a larger width in a portion close to a vehicle front end, when viewed in a vehicle transverse direction, than in a portion distant from the vehicle front end.

14. A vehicle occupant safety system (10) for a convertible vehicle, comprising a first airbag module (12) configured to be arranged on an A-pillar (16) of the convertible vehicle, the first airbag module (12) including a first airbag (14), and comprising a second airbag module (18) configured to be arranged on a steering wheel (22) of the convertible vehicle, the second airbag module (18) including a second airbag (20), wherein the first airbag (14) is configured to at least partially cover an area of a vehicle side window (28) and the second airbag (20) is configured to at least partially cover the steering wheel (22), wherein the first and second airbags (14, 20) are configured and arranged so that they contact each other in an inflated condition, wherein the first airbag (14) in the inflated condition has plural gas-filled chambers (25, 25') which in a vehicle longitudinal direction are successively arranged at least in portions.

15. A vehicle occupant safety system (10) for a convertible vehicle, comprising a first airbag module (12) configured to be arranged on an A-pillar (16) of the convertible vehicle, the first airbag module (12) including a first airbag (14), and comprising a second airbag module (18) configured to be arranged on a steering wheel (22) of the convertible vehicle, the second airbag module (18) including a second airbag (20), wherein the first airbag (14) is configured to at least partially cover an area of a vehicle side window (28) and the second airbag (20) is configured to at least partially cover the steering wheel (22), wherein the first and second airbags (14, 20) are configured and arranged so that they contact each other in an inflated condition, wherein the first airbag (14) is completely accommodated in an A-pillar lining.

* * * * *